(12) United States Patent
Hashimoto et al.

(10) Patent No.: US 7,547,747 B2
(45) Date of Patent: Jun. 16, 2009

(54) MODIFIED POLYALLYLAMINE AND PROCESS FOR PRODUCING THE SAME

(75) Inventors: Mitsumasa Hashimoto, Koriyama (JP); Minoru Takeuchi, Tokyo (JP); Shuichi Kataoka, Suwa (JP); Kiyohiko Takemoto, Suwa (JP)

(73) Assignee: Nitto Boseki Co., Ltd., Fukushima-shi, Fukushima (JP)

( * ) Notice: Subject to any disclaimer, the term of this patent is extended or adjusted under 35 U.S.C. 154(b) by 593 days.

(21) Appl. No.: 10/541,464

(22) PCT Filed: Feb. 17, 2004

(86) PCT No.: PCT/JP2004/001746

§ 371 (c)(1), (2), (4) Date: Sep. 28, 2005

(87) PCT Pub. No.: WO2004/089997

PCT Pub. Date: Oct. 21, 2004

(65) Prior Publication Data

US 2006/0122335 A1    Jun. 8, 2006

(30) Foreign Application Priority Data

Apr. 1, 2003    (JP) .............................. 2003-098120

(51) Int. Cl.
*C08F 8/30* (2006.01)
(52) U.S. Cl. ................. 525/328.2; 525/328.4; 525/374; 525/375; 526/258; 526/265; 526/301; 526/302; 526/304; 526/307; 526/310; 526/312
(58) Field of Classification Search ............. 525/328.2, 525/328.4, 374, 375; 526/258, 265, 301, 526/302, 304, 307, 310, 312
See application file for complete search history.

(56) References Cited

U.S. PATENT DOCUMENTS 2,662,875 A * 12/1953 Chaney ..................... 526/310
2,662,877 A * 12/1953 Chaney ..................... 525/328.4
4,680,360 A * 7/1987 Ueda et al. .................. 526/310
5,589,166 A * 12/1996 McTaggart et al. ........ 424/78.35
5,756,646 A * 5/1998 Nasu et al. .................. 528/310
6,268,452 B1 * 7/2001 Kato et al. ................... 526/310
6,290,947 B1 * 9/2001 Fitzpatrick et al. ........ 424/78.08
6,395,849 B1    5/2002 Kato et al.
2002/0147251 A1    10/2002 Ohta et al.

FOREIGN PATENT DOCUMENTS

| EP | 0 142 962 A2 | 5/1985 |
| EP | 0 791 605 A2 | 8/1997 |
| EP | 1 004 641 A1 | 5/2000 |
| JP | 60-106801 | 6/1985 |
| JP | 6-263826 | 9/1994 |
| JP | 7-68298 | 7/1995 |
| JP | 9-207424 | 8/1997 |
| JP | 9-235318 | 9/1997 |
| JP | 9-286816 | 11/1997 |
| JP | 9-286940 | 11/1997 |
| JP | 10-204120 | 8/1998 |
| JP | 10-316827 | 12/1998 |
| JP | 11-021321 | 1/1999 |
| WO | 99/21901 | 5/1999 |

OTHER PUBLICATIONS

International Search Report of PCT/JP2004/001746, mailed Jun. 8, 2004.

* cited by examiner

*Primary Examiner*—Bernard Lipman
(74) *Attorney, Agent, or Firm*—Nixon & Vanderhye P.C.

(57) ABSTRACT

The present invention relates to a polyallylamine-based high-molecular-weight polymer which is easily soluble in water and in an organic solvent and gives an excellently stable aqueous solution or organic solvent solution thereof which is suitable for use in the fields of fine chemicals such as the field of inkjet recording, and the polymer is a modified polyallylamine obtained by modifying a copolymer of N,N-dialkylallylamine and allylamine.

10 Claims, 1 Drawing Sheet

MODIFIED POLYALLYLAMINE AND PROCESS FOR PRODUCING THE SAME

This application is the US national phase of international application PCT/JP2004/001746, filed 17 Feb. 2004, which designated the U.S. and claims priority of JP 2003-98120, filed Apr. 1, 2003, the entire contents of each of which are hereby incorporated by reference.

TECHNICAL FIELD

The present invention relates to a modified polyallylamine and a process for producing the same. More specifically, the present invention relates to a modified polyallylamine that is easily soluble both in water and in an organic solvent and that attains excellent stability of an aqueous solution or organic solvent solution thereof and that is suitable for use in fine chemical fields such as an inkjet recording field, and a process for efficiently producing this modified polyallylamine.

TECHNICAL BACKGROUND

A polyallylamine (allylamine polymer) is a linear olefin polymer having an amino group on a side chain and is a cationic polymer compound that is well dissolved in water and is positively chargeable in water. This polyallylamine has characteristic reactive polymer structure and properties and is hence used in many fields including the fields of a dye binder for a reactive dye, a dye binder for a direct dye, an additive in an inkjet recording field, and the like.

As a use of a polyallylamine, for example, there is disclosed an inkjet recording method in which both an ink composition and a liquid composition containing a polyallylamine and an organic solvent are caused to separately adhere (for example, see JP-A-9-207424 and JP-A-9-286940). In this method, it is proposed to use a liquid composition containing a polyallylamine for improving a record in storage stability, color developability and glossiness. However, further improvement is required for attaining the realization of excellent cleaning operation in which no residual liquid mixture (waste liquid) of an ink composition and the above liquid composition occurs in a cleaning cap.

For this purpose, there has come to be required a polyallylamine-based high-molecular-weight polymer having useful properties of the polyallylamine as a cationic polymer, for example, the properties of retaining an improvement in color developability, having solubility in an organic solvent as well and attaining excellent stability of a solution thereof in an organic solvent.

As polyallylamine is studied in the use in the field of fine chemicals as described above, there has come to be practically required a new polyallylamine-based high-molecular-weight polymer having the properties of being soluble in various organic solvents and being stably present therein.

DISCLOSURE OF THE INVENTION

Under the circumstances, it is an object of the present invention to provide a polyallylamine-based high-molecular-weight polymer that has the properties of being soluble in an organic solvent and being stably soluble in a solution containing an organic solvent while it maintains the useful properties of a polyallylamine as a cationic polymer, and, for example, that maintains high performances of records with regard to color developability and the like and can be used in a liquid composition enabling excellent cleaning operation in which no residual liquid mixture (waste liquid) of an ink composition and the above liquid composition occurs in a cleaning cap in an inkjet recording method.

The present inventors have made diligent studies for developing a polyallylamine-based high-molecular-weight polymer having the above desirable properties, and as a result, have found that a modified polyallylamine having a specific structure is suitable for the above object, and that the above modified polyallylamine can be efficiently produced by a specific process. The present invention has been completed on the basis of the above finding.

That is, the present invention provides (1) a modified polyallylamine comprising, as an essential component, a unit of the general formula (M-1),

wherein each of $R^1$ and $R^2$ is independently an alkyl group having 1 to 4 carbon atoms, comprising at least one unit selected from units of the formula (M-2),

the general formula (M-3),

wherein $R^3$ is an alkyl group having 1 to 12 carbon atoms or an aryl group having 6 to 12 carbon atoms, the general formula (M-4),

wherein $R^4$ is an alkyl group having 1 to 12 carbon atoms, the general formula (M-5),

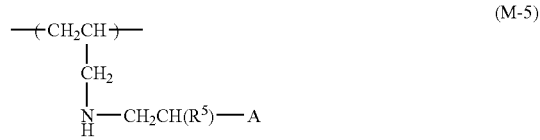

wherein $R^5$ is a hydrogen atom or methyl and A is —$CONR^6R^7$, —CN or —$COOR^8$, in which each of $R^6$ and $R^7$ is independently a hydrogen atom or an alkyl group having 1 to 8 carbon atoms and optionally containing a hydroxyl group, a keto group, a mono($C_1$-$C_4$ alkyl) amino group, a di($C_1$-$C_4$ alkyl) amino group or a tri($C_1$-$C_4$ alkyl) ammonium group and $R^6$ and $R^7$ may bond to each other and form a piperidino or morpholino group together with a nitrogen atom, and $R^8$ is an alkyl group having 1 to 8 carbon atoms and optionally containing a hydroxyl group, a keto group, a mono ($C_1$-$C_4$ alkyl) amino group, a di($C_1$-$C_4$ alkyl) amino group or a tri($C_1$-$C_4$ alkyl) ammonium group, the general formula (M-6),

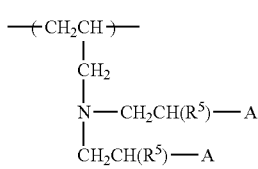

(M-6)

wherein $R^5$ and A are as defined above, the general formula (M-7),

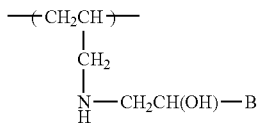

(M-7)

wherein B is an alkyl group having 1 to 8 carbon atoms and optionally containing a hydroxyl group, an alkoxyl or alkenyloxy group having 1 to 4 carbon atoms, and the general formula (M-8),

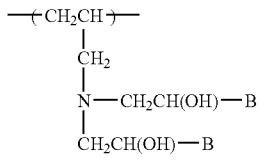

(M-8)

wherein B is as defined as said B, and optionally containing a unit of the formula (M-9),

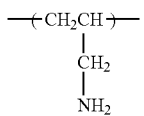

(M-9)

(2) a modified polyallylamine (to be referred to as "modified polyallylamine I" hereinafter) having a structure of the general formula (I),

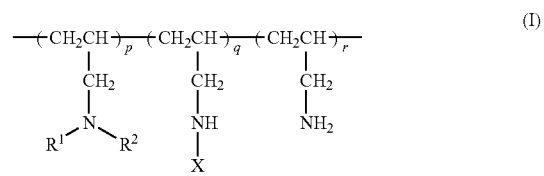

(I)

wherein each of $R^1$ and $R^2$ is independently an alkyl group having 1 to 4 carbon atoms, X is —$CONH_2$, —$COOR^3$, in which $R^3$ is an alkyl group having 1 to 12 carbon atoms or an aryl group having 6 to 12 carbon atoms, or —$COR^4$, in which $R^4$ is an alkyl group having 1 to 12 carbon atoms, each of p and q is independently an integer of 1 or more, and r is 0 or an integer of 1 or more, (3) a modified polyallylamine (to be referred to as "modified polyallylamine II" hereinafter) having a structure of the general formula (II),

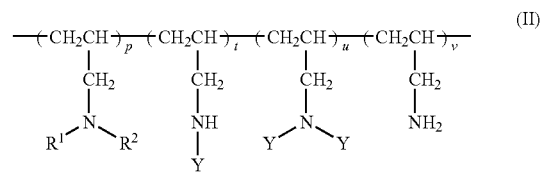

(II)

wherein each of $R^1$ and $R^2$ is independently an alkyl group having 1 to 4 carbon atoms, Y is —$CH_2CH(R^5)$—A, in which $R^5$ is a hydrogen atom or methyl and A is —$CONR^6R^7$, —CN or —$COOR^8$, in which each of $R^6$ and $R^7$ is independently a hydrogen atom or an alkyl group having 1 to 8 carbon atoms and optionally containing a hydroxyl group, a keto group, a mono($C_1$-$C_4$ alkyl) amino group, a di($C_1$-$C_4$ alkyl) amino group or a tri($C_1$-$C_4$ alkyl) ammonium group, $R^6$ and $R^7$ may bond to each other to form a piperidino or morpholino group together with a nitrogen atom, and $R^8$ is an alkyl group having 1 to 8 carbon atoms and optionally containing a hydroxyl group, a keto group, a mono($C_1$-$C_4$ alkyl) amino group, a di($C_1$-$C_4$ alkyl) amino group or a tri($C_1$-$C_4$ alkyl group) ammonium group, or —$CH_2CH(OH)$—B, in which B is an alkyl group having 1 to 8 carbon atoms and optionally containing a hydroxyl group or an alkoxyl or alkenyloxy group having 1 to 4 carbon atoms, p is an integer of 1 or more, and each of t, u and v is independently 0 or an integer of 1 or more, provided that at least one of t and u is an integer of 1 or more, (4) a process for producing a modified polyallylamine of the general formula (I-1), which comprises reacting a cyanic acid with a copolymer of N,N-dialkylallylamine and an allylamine, represented by the general formula (III),

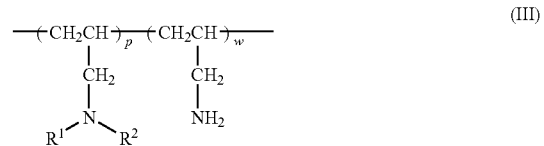

(III)

wherein each of $R^1$ and $R^2$ is independently an alkyl group having 1 to 4 carbon atoms and each of p and w is independently an integer of 1 or more, to produce the modified polyallylamine of the general formula (I-1),

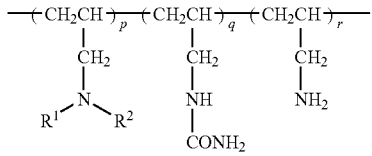

wherein $R^1$, $R^2$, p, q and r are as defined above, (5) a process for producing a modified polyallylamine of the general formula (I-2),

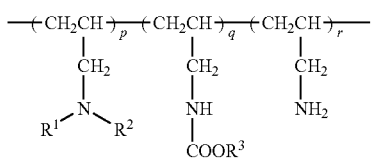

wherein $R^1$, $R^2$, $R^3$, p, q and r are as defined above, which comprises reacting an alkoxycarbonylation agent having 1 to 12 carbon atoms or an aryloxycarbonylation agent having 6 to 12 carbon atoms, with a copolymer of N,N-dialkylallylamine and an allylamine, represented by the general formula (III), (6) a process for producing a modified polyallylamine as recited in the above (5), wherein the alkoxycarbonylation agent or the aryloxycarbonylation agent is a carbonate diester represented by $R^3O$—CO—$OR^3$ in which $R^3$ is as defined above, (7) a process for producing a modified polyallylamine of the general formula (I-3),

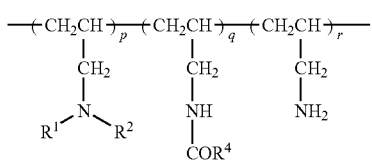

wherein $R^1$, $R^2$, $R^4$, p, q and r are as defined above, which comprises reacting an acylation agent having 1 to 12 carbon atoms with a copolymer of N,N-dialkylallylamine and an allylamine, represented by the general formula (III), (8) a process for producing a modified polyallylamine as recited in the above (7), wherein the acylation agent is an carboxylic anhydride of the general formula (IV),

 (IV)

wherein $R^4$ is as defined above, (9) a process for producing a modified polyallylamine of the general formula (II-1),

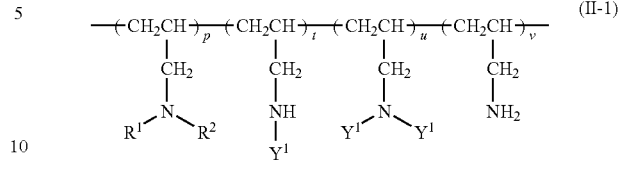

wherein $Y^1$ is a —$CH_2CH(R^5)$—A and $R^1$, $R^2$, $R^5$, A, p, t, u and v are as defined above,
which comprises reacting an acryl compound of the general formula (V), $$CH_2=C(R^5)-A \qquad (V)$$

wherein $R^5$ and A are as defined above, with a copolymer of N,N-dialkylallylamine and an allylamine, represented by the general formula (III),
and

(10) a process for producing a modified polyallylamine of the general formula (II-2),

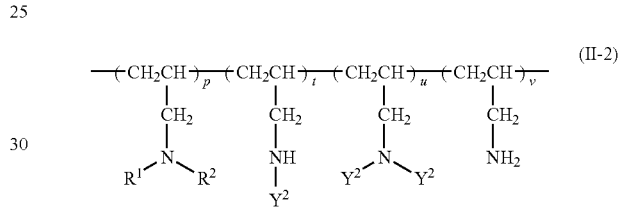

wherein $Y^2$ is a $CH_2CH(OH)$—B and $R^1$, $R^2$, B, p, t, u and v are as defined above,
which comprises reacting an epoxy compound of the general formula (VI),

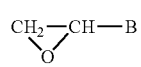 (VI)

wherein B is as defined above
with a copolymer of N,N-dialkylallylamine and an allylamine, represented by the general formula (III).

The modified polyallylamine of the present invention maintains the useful properties of a polyallylamine as a cationic polymer and at the same time is easily soluble in water and an organic solvent. Further, it is stably dissolved in a solution containing an organic solvent. In an inkjet recording method in which a liquid composition and an ink composition is mixed and a recording is made on a recording sheet, therefore, when the modified polyallylamine of the present invention is incorporated into the liquid composition, no residual waste liquid occurs, so that easy cleaning can be performed. That is, when the modified polyallylamine of the present invention is used in the above inkjet recording method, the basic performances required for the inkjet recording, such as color developability, etc., can be imparted to records to a high degree, a residual liquid mixture (waste liquid) of a liquid composition and an ink composition does not occur easily, and as a result, excellent cleaning operation which was not conventionally permitted can be realized. The present invention can provide a polymer remarkably useful in the fine chemical fields such as the inkjet recording field, and the like.

PREFERRED EMBODIMENTS OF THE INVENTION

Figure 1:
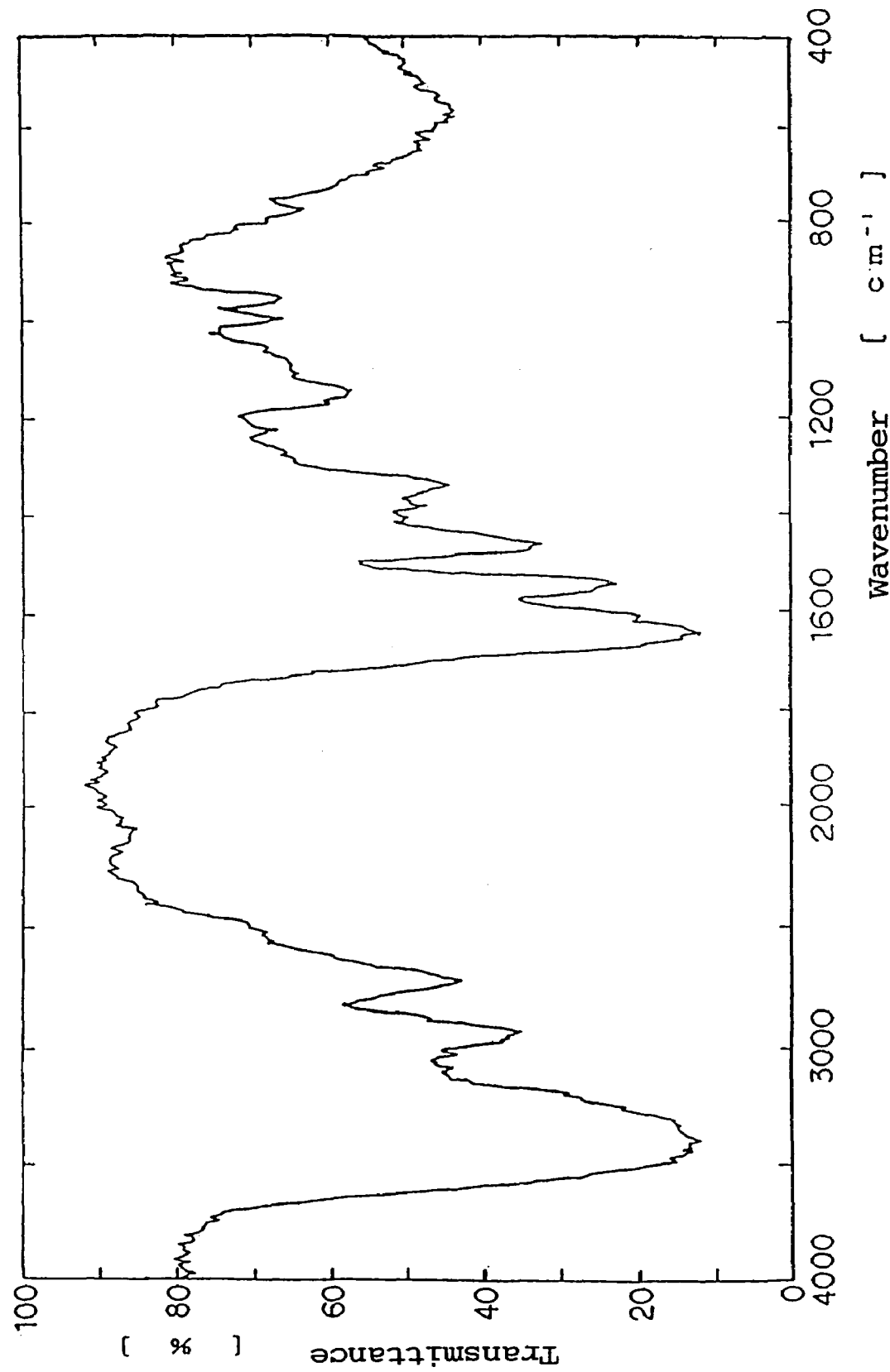
FIG. 1 is an infrared absorption (IR) spectrum chart of a modified polyallylamine obtained in Example 1.

First, the modified polyallylamine of the present invention will be explained.

As described above, the modified polyallylamine of the present invention is a copolymer or, generally, random copolymer containing, as an essential unit, a monomer unit of the general formula (M-1), containing at least one monomer unit selected from the monomer units of the formula (M-2), the general formula (M-3), the general formula (M-4), the general formula (M-5), the general formula (M-6), the general formula (M-7) and the general formula (M-8), and optionally containing a monomer unit of the formula (M-9). The modified polyallylamine of the present invention includes a modified polyallylamine I and a modified polyallylamine II as preferred embodiments.

The modified polyallylamine I of the present invention is a high-molecular-weight polymer or, generally, random copolymer having a structure of the general formula (I).

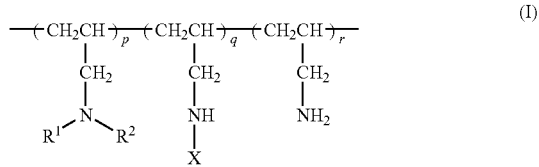

In the above general formula (I), $R^1$ and $R^2$ represent an alkyl group having 1 to 4 carbon atoms. The alkyl group may be linear or branched, and specific examples thereof include methyl, ethyl, propyl, isopropyl, n-butyl, isobutyl, sec-butyl and tert-butyl. While $R^1$ and $R^2$ may be the same as, or may be different from, each other, $R^1$ and $R^2$ are particularly preferably methyl. X is —CONH$_2$, —COOR$^3$ or —COR$^4$. $R^3$ is an alkyl group having 1 to 12 carbon atoms or an aryl group having 6 to 12 carbon atoms, and $R^4$ is an alkyl group having 1 to 12 carbon atoms. The alkyl group having 1 to 12 carbon atoms, represented by $R^3$, may be linear or branched, and examples thereof preferably include linear alkyl groups having 1 to 4 carbon atoms such as methyl, ethyl, propyl, butyl, and the like. Further, examples of the aryl group having 6 to 12 carbon atoms include phenyl, o-tolyl, m-tolyl and p-tolyl. The alkyl group having 1 to 12 carbon atoms, represented by $R^4$, may be linear or branched, and examples thereof include methyl, ethyl, n-propyl, isopropyl, n-butyl, n-pentyl, n-hexyl, n-heptyl, n-nonyl, and the like.

Each of p and q is independently an integer of 1 or more, and r is 0 or an integer of 1 or more. Further, the ratio of p/(q+r) is preferably 5/95 to 95/5, more preferably 10/90 to 90/10, particularly preferably 20/80 to 80/20. In view of the solubility of the above modified polyallylamine in an organic solvent and the stability of an organic solvent solution, further, the ratio of q/(q+r) (modification degree) is preferably 0.6-1, more preferably 0.9-1, and particularly preferably, it is substantially 1, that is, 0.95-1.

On the other hand, the weight average molecular weight of the modified polyallylamine I is preferably 5,000 or less, more preferably 200 to 3,000, particularly preferably 300 to 2,500. When the molecular weight is too large, the solubility in an organic solvent may be poor. When it is too small, a record may be poor in performances when the modified polyallylamine is applied to an inkjet recording method. The above weight average molecular weight refers to a value determined, as a polyethylene glycol, by measurement according to a gel permeation chromatography (GPC) method.

The modified polyallylamine II of the present invention is a high-molecular-weight polymer or, generally, random copolymer having a structure of the general formula (II).

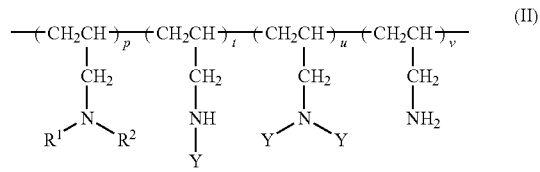

In the above general formula (II), $R^1$ and $R^2$ represent an alkyl group having 1 to 4 carbon atoms. This alkyl group is as explained with regard to $R^1$ and $R^2$ in the above modified polyallylamine I.

Y is —CH$_2$CH(R$^5$)—A or —CH$_2$CH(OH)—B. First, the —CH$_2$CH(R$^5$)—A represented by Y will be explained. $R^5$ is a hydrogen atom or methyl. A is —CONR$^6$R$^7$, —CN or —COOR$^8$. Each of $R^6$ and $R^7$ is independently a hydrogen atom or an alkyl group having 1 to 8 carbon atoms and optionally containing a hydroxyl group, a keto group, a mono (C$_1$-C$_4$ alkyl) amino group, a di(C$_1$-C$_4$ alkyl) amino group or a tri(C$_1$-C$_4$ alkyl) ammonium group. $R^6$ and $R^7$ may bond to each other to form a piperidino or morpholino group together with a nitrogen atom. $R^8$ is an alkyl group having 1 to 8 carbon atoms, and the alkyl group may contain a hydroxyl group, a keto group, a mono(C$_1$-C$_4$ alkyl) amino group, a di(C$_1$-C$_4$ alkyl) amino group or a tri(C$_1$-C$_4$ alkyl) ammonium group.

When —A is —CONR$^6$R$^7$, examples of the —CH$_2$CH(R$^5$)—A include —CH$_2$CH$_2$CONH$_2$, —CH$_2$CH$_2$CONHCH$_3$, —CH$_2$CH$_2$CON(CH$_3$)$_2$, —CH$_2$CH$_2$CONHC$_2$H$_5$, —CH$_2$CH$_2$CON(C$_2$H$_5$)$_2$, —CH$_2$CH$_2$CONH-nC$_3$H$_7$, —CH$_2$CH$_2$CON(nC$_3$H$_7$)$_2$, —CH$_2$CH$_2$CONH-iC$_3$H$_7$, —CH$_2$CH$_2$CONHCH$_2$O-nC$_4$H$_9$, —CH$_2$CH$_2$CONHCH$_2$OH, —CH$_2$CH$_2$CONHCH$_2$CH$_2$N(CH$_3$)$_2$, —CH$_2$CH$_2$CONHCH$_2$CH$_2$N(C$_2$H$_5$)$_2$, —CH$_2$CH$_2$CONHCH$_2$CH$_2$CH$_2$N(CH$_3$)$_2$, —CH$_2$CH$_2$CONHCH$_2$CH$_2$CH$_2$N(C$_2$H$_5$)$_2$, —CH$_2$CH$_2$CONHCH$_2$CH$_2$N$^+$(CH$_3$)$_3$, —CH$_2$CH$_2$CONHCH$_2$CH$_2$N$^+$(C$_2$H$_5$)$_3$, —CH$_2$CH$_2$CONHCH$_2$CH$_2$CH$_2$N$^+$(CH$_3$)$_3$, —CH$_2$CH$_2$CONHCH$_2$CH$_2$CH$_2$N$^+$(C$_2$H$_5$)$_3$, —CH$_2$CH$_2$CO-morpholino group, —CH$_2$CH$_2$CO-piperidino group, —CH$_2$CH(CH$_3$)CONH$_2$, —CH$_2$CH(CH$_3$)CONHCH$_3$, —CH$_2$CH(CH$_3$)CON(CH$_3$)$_2$, —CH$_2$CH(CH$_3$)CONHC$_2$H$_5$, —CH$_2$CH(CH$_3$)CON(C$_2$H$_5$)$_2$, —CH$_2$CH(CH$_3$)CONH-nC$_3$H$_7$, —CH$_2$CH(CH$_3$)CON(nC$_3$H$_7$)$_2$, —CH$_2$CH(CH$_3$)CONH-iC$_3$H$_7$, —CH$_2$CH(CH$_3$)CONHCH$_2$O-nC$_4$H$_9$, —CH$_2$CH(CH$_3$)CONHCH$_2$OH, —CH$_2$CH(CH$_3$)CONHCH$_2$CH$_2$N(CH$_3$)$_2$, —CH$_2$CH(CH$_3$)CONHCH$_2$CH(CH$_3$)N(C$_2$H$_5$)$_2$, —CH$_2$CH(CH$_3$)CONHCH$_2$CH$_2$CH$_2$N(CH$_3$)$_2$, —CH$_2$CH(CH$_3$)CONHCH$_2$CH$_2$CH$_2$N(C$_2$H$_5$)$_2$, —CH$_2$CH(CH$_3$)CONHCH$_2$CH$_2$N$^+$(CH$_3$)$_3$, —CH$_2$CH(CH$_3$)CONHCH$_2$CH$_2$N$^+$(C$_2$H$_5$)$_3$, —CH$_2$CH(CH$_3$)CONHCH$_2$CH$_2$CH$_2$N$^+$(CH$_3$)$_3$, —CH$_2$CH(CH$_3$)CONHCH$_2$CH$_2$CH$_2$N$^+$(C$_2$H$_5$)$_3$, —CH$_2$CH(CH$_3$)CO-morpholino group, —CH$_2$CH(CH$_3$)CO-piperidino group and the like.

When —A is CN, examples of the —CH$_2$CH(R$^5$)—A include —CH$_2$CH$_2$CN and —CH$_2$CH(CH$_3$)CN. Further, when —A is COOR$^8$, examples of the —CH$_2$CH(R$^5$)—A include —CH$_2$CH$_2$COOCH$_3$, —CH$_2$CH$_2$COOC$_2$H$_5$, —CH$_2$CH$_2$COOC$_3$H$_7$, —CH$_2$CH$_2$COOC$_4$H$_9$, —CH$_2$CH$_2$COOCH$_2$CH$_2$N(CH$_3$)$_2$, —CH$_2$CH$_2$COOCH$_2$CH$_2$CH$_2$N(CH$_3$)$_2$, —CH$_2$CH$_2$COOCH$_2$CH$_2$N(C$_2$H$_5$)$_2$, —CH$_2$CH$_2$COOCH$_2$CH$_2$CH$_2$N(C$_2$H$_5$)$_2$, —CH$_2$CH$_2$COOCH$_2$CH$_2$N$^+$(CH$_3$)$_3$, —CH$_2$CH$_2$COOCH$_2$CH$_2$N$^+$(C$_2$H$_5$)$_3$, and —CH$_2$CH$_2$COOCH$_2$CH$_2$CH$_2$N$^+$(C$_2$H$_5$)$_3$. In a quaternary ammonium salt, examples of the counter ion include Cl$^-$, Br$^-$ and I$^-$.

The —CH$_2$CH(OH)—B represented by Y will be explained below. B is an alkyl group having 1 to 8 carbon atoms, and the alkyl group may contain a hydroxyl group or an alkoxyl or alkenyloxy group having 1 to 4 carbon atoms, Examples of B include methyl, ethyl, propyl, butyl, pentyl, hexyl, methoxymethyl, ethoxymethyl, propyloxymethyl, butoxymethyl, pentoxymethyl, hydroxymethyl and (2-propenyloxy)methyl.

Examples of the —CH$_2$CH(OH)—B include 2-hydroxypropyl, 2-hydroxybutyl, 2-hydroxypentyl, 2-hydroxyhexyl, 2-hydroxyheptyl, 2-hydroxyoctyl, 3-methoxy-2-hydroxypropyl, 3-ethoxy-2-hdyroxypropyl, 3-propoxy-2-hydroxypropyl, 3-(isopropoxy)-2-hydroxypropyl, 3-butoxy-2-hydroxypropyl, 3-pentoxy-2-hydroxypropyl, 2,3-dihydroxypropyl and 3-(2-propenyloxy)-2hydroxypropyl.

In the above general formula (II), p is an integer or 1 or more, and each of t, u and v is independently 0 or an integer of 1 or more, while at least one of t and u is an integer of 1 or more. Further, the ratio of p/(t+u+v) is preferably 5/95 to 95/5, more preferably 10/90 to 90/10, particularly preferably 20/80 to 80/20. In view of solubility and stability of the modified polyallylamine, further, the ratio of (t+u)/(t+u+v) (modification degree) is preferably from 0.6 to 1, more preferably from 0.9 to 1, particularly preferably, substantial 1, that is, from 0.95 to 1.

On the other hand, the weight average molecular weight of the modified polyallylamine II is preferably 5,000 or less, more preferably 200 to 3,000, particularly preferably 300 to 2,500. When the molecular weight is too large, the solubility in an organic solvent may be poor. When it is too small, a record may be poor in performances when the modified polyallylamine is applied to an inkjet recording method. The above weight average molecular weight refers to a value determined, as a polyethylene glycol, by measurement according to a gel permeation chromatography (GPC) method.

The process for producing a modified polyallylamine, provided by the present invention, will be explained hereinafter.

First, concerning the modified polyallylamine I of the general formula (I), the modified polyallylamines of the general formula (I-1), the general formula (I-2) and the general formula (I-3) can be produced as follows.

[Production of Modified Polyallylamine of the General Formula (I-1)]

In this case, a cyanic acid as an N-carbamoylation reagent is reacted with a copolymer of N,N-dialkylallylamine and allylamine, generally a random copolymer thereof (to be sometimes referred to as "raw material copolymer" hereinafter), represented by the general formula (III),

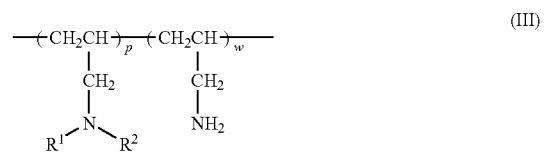

wherein w is an integer of 1 or more, and R$^1$, R$^2$ and p are as defined above, to produce a modified polyallylamine of the general formula (I-1) in which the primary amino group is carbamoylated,

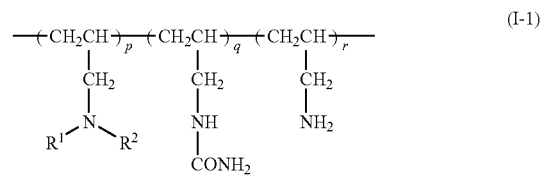

wherein R$^1$, R$^2$, p, q and r are as defined above.

The raw material copolymer of the above general formula (III) can be prepared, for example, according to the method described in WO 00/21901. Examples of the monomer for forming the N,N-dialkylallylamine unit include N,N-dimethylallylamine, N,N-diethylallylamine, N,N-dipropylallylamine and N,N-dibutylallylamine. In view of solubility of a modified product, N,N-dimethylallylamine is preferred.

The weight average molecular weight of the raw material copolymer (value as polyethylene glycol, measured by GPC method) is preferably 5,000 or less, more preferably 200 to 3,000, particularly preferably 300 to 2,500. When the molecular weight is too high, a formed modified polyallylamine, which is the modified polyallylamine of the present invention, is sometimes not easily soluble. When it is too low, a record is sometimes poor in performances when the modified polyallylamine is applied to inkjet recording. The monomer unit ratio p/w of the raw material copolymer is preferably 5/95 to 95/5, more preferably 10/90 to 90/10, particularly preferably 20/80 to 80/20.

When the cyanic acid is reacted with the raw material copolymer to produce the modified polyallylamine (I-1) of the present invention, preferably, the cyanic acid salt is added to the salt of raw material copolymer to carry out a reaction of them. A typical production embodiment will be described below.

The raw material copolymer is dissolved in water or a polar solvent, and a solution of an inorganic acid such as hydrochloric acid or the like is added thereto to prepare a copolymer salt solution. In this case, the concentration of the raw material copolymer is preferably 5 to 50% by weight. The solution of the raw material copolymer salt is heated to 30 to 80° C., and an aqueous solution of a cyanate such as sodium cyanate, potassium cyanate or the like is dropwise added thereto, and the mixture is allowed to react for approximately 1 to 100 hours. In this reaction, a salt (sodium chloride when the raw material copolymer is a hydrochloride and when the cyanic acid salt is sodium cyanate) is produced as a byproduct. After completion of the reaction, unreacted hydrochloric acid is neutralized with an alkali such as sodium hydroxide as required, and then, the reaction mixture is subjected to desalting procedure such as electrodialysis, whereby the modified polyallylamine (a copolymer, or the like, which contains N,N-dialkylallylamine unit and N-carbamoylated allylamine unit) of the present invention can be obtained. Advantageously, the amount of the cyanate to be used based on the allylamine unit is preferably 0.6 to 1 mole equivalent, more preferably 0.9 to 1 mole equivalent, particularly preferably 1 mole equivalent.

[Production of Modified Polyallylamine of the General Formula (I-2)]

In this case, an alkoxycarbonylation agent having 1 to 12 carbon atoms or an aryloxycarbonylation agent having 6 to 12 carbon atoms is reacted with the raw material copolymer of the above general formula (III), to produce a modified polyallylamine of the general formula (I-2) in which the primary amino group is alkoxy- or aryloxycarbonylated,

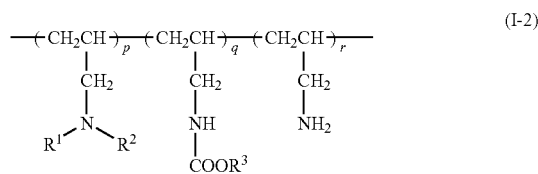

(I-2)

wherein $R^1$, $R^2$, $R^3$, p, q and r are as defined above.

As the above alkoxycarbonylation agent or aryloxycarbonylation agent, a carbonic acid diester represented by $R^3O-CO-OR^3$ (in which $R^3$ is an alkyl group having 1 to 12 carbon atoms or an aryl group having 6 to 12 carbon atoms) is preferred in view of reactivity. Examples of the carbonic acid diester include dimethyl carbonate, diethyl carbonate, dipropyl carbonate, dibutyl carbonate, diphenyl carbonate, di(o-tolyl) carbonate, di(m-tolyl) carbonate and di(p-tolyl) carbonate.

When the raw material copolymer and the above carbonic acid diester are reacted to produce the modified polyallylamine (I-2) of the present invention, first, the carbonic acid diester can be gradually dropwise added to a solution such as an aqueous solution, or the like, of the raw material copolymer. In this case, there can be also employed a constitution in which a solution of the carbonic acid diester in a solvent is dropwise added to the raw material copolymer. In this constitution, generally, the solvent for dissolving the carbonic acid diester is preferably the same as the solvent for dissolving the raw material copolymer. The reaction between the raw material copolymer and the carbonic acid diester is preferably carried out with stirring. The reaction temperature is maintained preferably at 0 to 100° C., more preferably at 30 to 60° C. When the reaction temperature is too high, a formed urethane may be sometimes decomposed. The reaction time period is generally 1 to 100 hours, preferably 3 to 48 hours, and the modified polyallylamine of the present invention can be obtained in the form of a solution. After completion of the reaction, the solution is concentrated for removing an alcohol formed as a byproduct, whereby the modified polyallylamine (a copolymer or the like, containing N,N-dialkylallylamine unit and alkoxycarbonylated allylamine unit) of the present invention can be obtained in the form of a solution. When water is used as a solvent and when dimethyl carbonate, diethyl carbonate or dipropyl carbonate is used as a carbonic acid diester, preferably, the concentration is carried out under reduced pressure at a temperature of 25 to 70° C., preferably 35 to 60° C. When the temperature is too high, a side reaction can take place.

In this process, the N-alkoxycarbonylation degree (or aryloxycarbonylation degree) is dependent upon the amount of the carbonic acid diester used as a raw material. When a carbonic acid diester is used in an amount equimolar to the amount of amino groups of the raw material copolymer, generally, almost all of the amino groups are converted to urethane. Therefore, the N-alkoxycarbonylation degree (or aryloxycarbonylation degree) of the modified polyallylamine of the present invention that is to be produced can be adjusted by adjusting the amount of the carbonic acid diester used as a raw material.

[Production of Modified Polyallylamine of the General Formula (I-3)]

In this case, an acylation agent whose alkyl group has 1 to 12 carbon atoms is reacted with the raw material copolymer of the above general formula (III), to produce a modified polyallylamine of the general formula (I-3) in which the primary amino group is acylated,

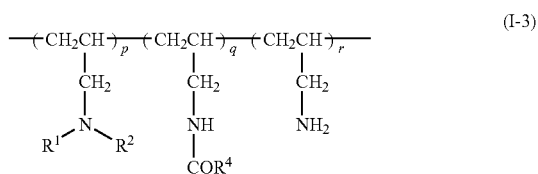

(I-3)

wherein $R^1$, $R^2$, $R^4$, p, q and r are as defined above.

As the above acylation agent, there can be used an carboxylic anhydride of the general formula (IV),

$(R^4CO)_2O$ (IV)

wherein $R^4$ is as defined above.

Examples of the above carboxylic anhydride include acetic anhydride, propionic anhydride, n-butyric anhydride, isobutyric anhydride, valeric anhydride, hexanoic anhydride, octaonic anhydride, decanoic anhydride and lauric anhydride. When the raw material copolymer is acylated with regard to 50 mol % or less of its amino groups, the carboxylic anhydride can be used in an amount equivalent to the equivalent weight of the amino groups to be acylated. The solvent for preparing a solution of the raw material copolymer can be selected from water, an organic solvent or a solvent mixture of water with an organic solvent. As an organic solvent, a polar solvent is preferred in view of solubility of the raw material. The organic solvent can be selected from alcohols such as methyl alcohol, ethyl alcohol, n-propyl alcohol, isopropyl alcohol and n-butyl alcohol, and it can be also selected from acetonitrile, formamide, N,N-dimethylformamide, dimethyl sulfoxide, tetrahydrofuran or 1,4-dioxane. Of these, water is preferred in view of safety and easiness in operation.

In the present invention, when the carboxylic anhydride is reacted with the raw material copolymer, the carboxylic anhydride can be gradually dropwise added to a solution of the copolymer. Although differing depending upon a reaction scale, the carboxylic anhydride is generally dropwise added over 2 to 8 hours. When the reaction scale is small, the addition can be carried out over a smaller period of time than the above, and it can be generally carried out over 1 to 8 hours. The reaction is preferably carried out with stirring. Since the above reaction is an exothermic reaction, it is preferred to carry out the reaction with cooling a reactor with ice, or the like, and the reaction solution is preferably maintained at a 40° C. or lower, more preferably, at 0 to 10° C. After completion of the acylation, generally, an aqueous solution of an alkali such as sodium hydroxide, potassium hydroxide, sodium carbonate, or the like is added to the reaction solution, to neutralize a carboxylic acid derived from an carboxylic anhydride formed on a side-chain amino group of an intermediate formed after the acylation, whereby a solution of a free acylated modified polyallylamine of the present invention can be produced.

However, the acylation is carried out with regard to more than 50 mol % of primary amino groups of the raw material copolymer, the acylation may be proceeded with while the carboxylic anhydride formed on a side-chain amino group of the intermediate is neutralized with an alkali such as sodium hydroxide, potassium hydroxide, sodium carbonate, or the like as required. In this case, preferably, the reaction liquid is maintained at a pH of 10 to 12. In the neutralization, preferably, the reaction liquid is maintained at 0 to 10° C. After completion of the neutralization, the resultant solution is dialyzed to remove a neutralization salt, whereby a solution of a purified free acylated modified polyallylamine of the present invention can be obtained.

For the dialysis for removing the neutralization salt, it is preferred to employ the electrodialysis described in JP-B-7-68289 in view of easiness in operation. In this case, generally, the acylated polyallylamine solution under purification is subjected to GPC chromatography, the content of a salt present in the solution can be easily monitored, so that the termination of the purification can be determined by employing GPC chromatography.

When the carboxylic anhydride is used in an amount less than the equivalent weight of the primary amino group of the raw material copolymer, generally, almost all of the carboxylic anhydride is consumed as an acylation agent. The acylation degree of the modified polyallylamine of the present invention can be adjusted on the basis of the amount of the carboxylic anhydride.

Concerning the modified polyallylamine II of the general formula (II), modified polyallylamines of the general formula (II-1) and the general formula (II-2) can be produced as follows.

[Production of Modified Polyallylamine of the General Formula (II-1)]

In this case, an acryl compound of the general formula (V)

$$CH_2=C(R^6)-A \quad (V)$$

wherein $R^5$ and A are as defined above, is reacted with the raw material monomer of the above general formula (III), to produce a modified polyallylamine of the general formula (II-1), in which the acryl compound is Michael-added to the primary amino group,

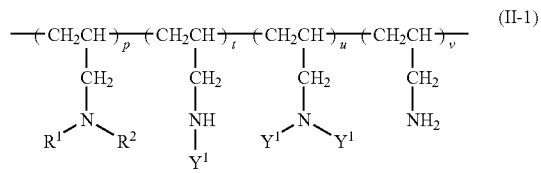

(II-1)

wherein $R^1$, $R^2$, $Y^1$, p, t, u and v are as defined above.

The above modification is carried out by a Michael addition reaction in which the above acryl compound is added to the primary amino group of the raw material copolymer.

The above acryl compound is selected from a compound having an acrylamide skeleton, a compound having an acrylonitrile skeleton or a compound having an acrylic ester skeleton. Examples of the compound having an acrylamide skeleton include acrylamide, N-methyl acrylamide, N,N-dimethyl acrylamide, N-ethyl acrylamide, N,N-diethyl acrylamide, N-n-propyl acrylamide, N,N-di(n-propyl) acrylamide, N-isopropyl acrylamide, N-n-butyl acrylamide, N-isobutyl acrylamide, N-methylol acrylamide, N,N-dimethylaminoethyl acrylamide, N,N-diethylaminoethyl acrylamide, N,N-dimethylaminopropyl acrylamide, N,N-diethylaminopropyl acrylamide, N,N-dimethylaminoethyl acrylamide-methyl chloride quaternary salt, N,N-diethylaminoethyl acrylamide-methyl chloride quaternary salt, N,N-dimethylaminopropyl acrylamide-methyl chloride quaternary salt, N,N-diethylaminopropyl acrylamide-methyl chloride quaternary salt, acryloyl morpholine, acryloyl piperidine, methacrylamide, N-methyl methacrylamide, N,N-dimethyl methacrylamide, N-ethyl methacrylamide, N,N-diethyl methacrylamide, N-n-propyl methacrylamide, N,N-di (n-propyl) methacrylamide, N-isopropyl methacrylamide, N-n-butyl methacrylamide, N-isobutyl methacrylamide, N-methylol methacrylamide, N,N-dimethylaminoethyl methacrylamide, N,N-diethylaminoethyl methacrylamide, N,N-dimethylaminopropyl methacrylamide, N,N-diethylaminopropyl methacrylamide, N,N-dimethylaminoethyl methacrylamide-methyl chloride quaternary salt, N,N-diethylaminoethyl methacrylamide-methyl chloride quaternary salt, N,N-dimethylaminopropyl methacrylamide-methyl chloride quaternary salt, N,N-diethylaminopropyl methacrylamide-methyl chloride quaternary salt, methacryloyl morpholine and methacryloyl piperidine. Examples of the compound having an acrylonitrile skeleton include acrylonitrile and methacrylonitrile. Examples of the compound having an acrylic ester skeleton include methyl acrylate, ethyl acrylate, propyl acrylate, butyl acrylate, N,N-dimethylaminoethyl acrylate, N,N-diethylaminoethyl acrylate, N,N-dimethylaminopropyl acrylate, N,N-diethylaminopropyl acrylate, N,N-dimethylaminoethyl acrylate-methyl chloride quaternary salt, N,N-diethylaminoethyl acrylate-methyl chloride quaternary salt, N,N-dimethylaminopropyl acrylate-methyl chloride quaternary salt and N,N-diethylaminopropyl acrylate-methyl chloride quaternary salt.

In the present invention, the amount of the acryl compound based on the primary amino group of the raw material copolymer is preferably 60 to 200 mol %, more preferably 70 to 120 mol %, particularly preferably 90 to 105 mol %. The degree of substitution of the acryl compound on the amino group is dependent upon the acryl compound added. Generally, when the amount of the acryl compound is 100 mol % or less based on the primary amino group, one acryl compound molecule is added to one primary amino group. When it exceeds 100 mol %, there are consecutively formed units in each of which two acryl compound molecules are added to one primary amino group.

In the present invention, for example, the following procedures can be employed when the above acryl compound is reacted with the raw material copolymer.

The raw material copolymer is dissolved in water, methanol or a mixture of these with a polar solvent. The concentration of the raw material copolymer is adjusted to approximately 5 to 60% by weight. While the reaction mixture is maintained at 30 to 70° C., the above acryl compound is added directly when it is a liquid, or the above acryl compound is dropwise added in the form of a solution thereof in water or methanol when it is a solid. After completion of the addition, the mixture is allowed to react for approximately 0.5 to 48 hours.

[Production of Modified Polyallylamine of the General Formula (II-2)]

In this case, an epoxy compound of the general formula (VI)

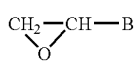   (VI)

wherein B is as defined above, is reacted with the raw material monomer of the above general formula (III), to produce a modified polyallylamine of the general formula (II-2), in which the epoxy compound is added to the primary amino group,

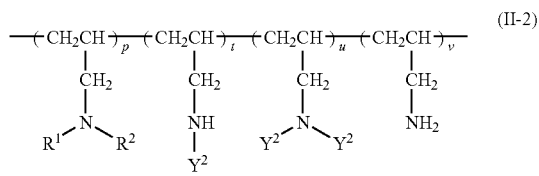   (II-2)

wherein $R^1$, $R^2$, $Y^2$, p, t, u and v are as defined above.

Examples of the epoxy compound of the above general formula (VI) include 1,2-epoxypropane, 1,2-epoxy-n-butane, 1,2-epoxy-n-pentane, 1,2-epoxy-n-hexane, 1,2-epoxy-n-heptane, 1,2-epoxy-n-octane, methyl glycidyl ether, ethyl glycidyl ether, n-propyl glycidyl ether, isopropyl glycidyl ether, n-butyl glycidyl ether, n-pentyl glycidyl ether, glycidol and allyl glycidol ether.

In the present invention, the amount of the above epoxy compound based on the primary amino group of the raw material copolymer is preferably 60 to 200 mol %, more preferably 70 to 150 mol %, particularly preferably 90 to 120 mol %. The degree of substitution of the epoxy compound on the amino group is dependent upon the amount of the epoxy compound used.

The modified polyallylamine (II-2) of the present invention can be easily produced by dissolving the raw material copolymer in a solvent, adding the above epoxy compound to the resultant solution and allowing the mixture to react at approximately 20 to 70° C. Water is preferred as a solvent for use in the reaction.

The reaction temperature for the reaction between the polyallylamine and the epoxy compound is generally 20 to 70° C., preferably 30 to 60° C. Although the reaction time period differs depending upon reaction conditions, generally, it is sufficient to take 0.5 to 48 hours for the reaction.

EXAMPLES

The present invention will be explained more in detail with reference to Examples hereinafter, while the present invention shall not be limited by these Examples. Polymers were measured for weight average molecular weights by a method described below.

<Measurement of Weight Average Molecular Weight of Polymer>

Polymers were measured for weight average molecular weights with a "Hitachi L-6000 model" high-performance liquid chromatograph according to a gel permeation chromatography (GPC method). "Hitachi L-6000" was used as an eluting solution flow line pump, a "Shodex RI SE-61" differential refractive index detector was used as a detector, and a column prepared by connecting two units each of aquagel filtration type "GS-220HQ" (exclusion limit molecular weight 3,000) and "GS-620HQ" (exclusion limit molecular weight $2 \times 10^6$) of Asahi Pack K.K. was used as a column. Samples were adjusted so as to have a concentration of 0.5 g/100 ml in an eluting solution, and 20 µl of each was used. A 0.4 mol/L sodium chloride aqueous solution was used as an eluting solution. The measurements were made at a column temperature of 30° C. at a flow rate of 1.0 ml/minute. As standard samples, polyethylene glycols having molecular weights of 106, 194, 440, 600, 1,470, 4,100, 7,100, 10,300, 12,600, 23,000, etc., were used to prepare calibration curve, and the weight average molecular weights Mw of polymers were determined on the basis of the calibration curve.

Preparation Example 1 Preparation of Copolymer of N,N-dimethylallylamine and Allylamine (5/5)

A 2-liter four-necked separable flask having a stirrer, a Dimroth condenser and a thermometer was charged with 431.24 g of an N,N-dimethylallylamine hydrochloride aqueous solution having a concentration of 63.45 wt % and 362.25 g of a monoallylamine hydrochloride aqueous solution having a concentration of 58.11 wt %. This monomer aqueous solution was warmed to 60° C., 146.45 g of 2,2'-azobis(2-amidinopropane)dihydrochloride was added as a radical initiator, and the monomer were polymerized for 120 hours.

After completion of the polymerization, 332.78 g of a sodium hydroxide aqueous solution having a concentration of 50 wt % was dropwise added with cooling with ice to neutralize the hydrochloride. After completion of the neutralization, unreacted monomers were distilled off under reduced pressure (10.6 kPa) at 50° C.

The thus-obtained solution was subjected to electrodialysis for desalting, to give 1,914.97 g of an aqueous solution having a concentration of 14.35 wt % of a free type copolymer (copolymerization ratio 5:5) of N,N-dimethylallylamine and allylamine.

Part of the copolymer aqueous solution was converted to a hydrochloride, and the hydrochloride was reprecipitated from an acetone solvent to give a copolymer hydrochloride. The elemental analysis thereof shows a result of C=44.80, H=9.12 and N=12.58. These values are equivalent to calculated values of C=44.66, H=9.37 and N=13.02. Table 1 shows preparation conditions, a yield, etc., of this Preparation Example together with results in Preparation Examples 2 and 3.

Preparation Example 2 Preparation of Copolymer of N,N-dimethylallylamine and Allylamine (3/7)

1,978.93 Grams of an aqueous solution having a concentration of 14.27 wt % of a free type copolymer (copolymerization ratio 3:7) of N,N-dimethylallylamine and allylamine was obtained in the same manner as in Preparation Example 1 except that the amount of the N,N-dimethylallylamine hydrochloride aqueous solution having a concentration of 63.45 wt % was changed to 258.75 g and that the amount of the monoallylamine hydrochloride aqueous solution having a concentration of 58.11 wt % was changed to 507.15 g.

Preparation Example 3 Preparation of Copolymer of N,N-dimethylallylamine and Allylamine (7/3)

2,045.55 Grams of an aqueous solution having a concentration of 14.20 wt % of a free type copolymer (copolymerization ratio 7:3) of N,N-dimethylallylamine and allylamine was obtained in the same manner as in Preparation Example 1 except that the amount of the N,N-dimethylallylamine hydrochloride aqueous solution having a concentration of 63.45 wt % was changed to 603.74 g and that the amount of the monoallylamine hydrochloride aqueous solution having a concentration of 58.11 wt % was changed to 217.35 g.

TABLE 1

| | DMAA.HCl/ AA.HCl | Concentration (%) | Polymerization time period (h) | Yield (%) |
|---|---|---|---|---|
| PEx. 1 | 0.5/0.5 | 61 | 120 | 86 |
| PEx. 2 | 0.3/0.7 | 60 | 120 | 96 |
| PEx. 3 | 0.7/0.3 | 62 | 120 | 84 |

(Notes)
PEx. = Preparation Example
DMAA.HCl: N,N-dimethylallylamine hydrochloride
AA.HCl: monoallylamine hydrochloride Example 1

Production of Copolymer of N,N-Dimethylallylamine and Carbamoylated Allylamine (5/5)

A one-liter four-necked separable flask having a stirrer, a Dimroth condenser and a thermometer was charged with 421.29 g of the aqueous solution having a concentration of 14.35 wt % of a free type copolymer of N,N-dimethylallylamine and allylamine, prepared in Preparation Example 1, and 88.65 g of hydrochloric acid having a concentration of 35 wt % with stirring with ice. Then, the mixture was warmed to 50° C., 368.37 g of sodium cyanate aqueous solution having a concentration of 7.5% was dropwise added, and the mixture was allowed to react for 24 hours.

After completion of the reaction, 34.00 g of sodium hydroxide having a concentration of 50 wt % was dropwise added with cooling with ice, to neutralize unreacted hydrochloride acid.

The thus-obtained solution was subjected to electrodialysis for desalting, to give 729.61 g (yield 95%) of an aqueous solution having a concentration of 10.30 wt % of a free type copolymer (copolymerization ratio 5:5) of N,N-dimethylallylamine and carbamoylated allylamine. The copolymer had a weight average molecular weight of 1,200.

The copolymer was concentrated to obtain a solid, and the polymer was tested for its solubility at 10% by weight in various solvents. As a result, the polymer was insoluble in acetone and acetonitrile, while it was dissolved in methanol, ethanol, isopropanol, DMSO and DMF. These results show that the copolymer of the present invention is soluble in organic solvents as compared with an allylamine polymer.

Part of the copolymer aqueous solution was converted to a hydrochloride, and the hydrochloride was reprecipitated from an acetone solvent to give a copolymer hydrochloride. This result shows that the modified polyallylamine of the present invention can be converted to a cationic polymer. The elemental analysis thereof showed a result of C=48.96, H=8.58 and N=18.64. These values were equivalent to calculated values of C=48.75, H=9.09 and N=18.95. The carbamoylation molar fraction of the copolymer hydrochloride was calculated on the basis of acid-base titration. As a result, it was 47.89%, which was nearly in agreement with the elemental analysis result. FIG. 1 shows the IR spectrum thereof.

Example 2

Production of Copolymer of N,N-Dimethylallylamine and Carbamoylated Allylamine (3/7)

767.83 Grams (yield 95%) of an aqueous solution having a concentration of 10.02 wt % of a free type copolymer (copolymerization ratio 3:7) of N,N-dimethylallylamine and carbamoylated allylamine was obtained in the same manner as in Example 1 except that 390.23 g of the aqueous solution having a concentration of 14.27 wt % of a free type copolymer of N,N-dimethylallylamine and allylamine, prepared in Preparation Example 2, as a replacement for the aqueous solution of a free type copolymer of N,N-dimethylallylamine and allylamine, prepared in Example 1, 515.72 g of the sodium cyanate aqueous solution and 20.40 g of the sodium hydroxide aqueous solution were used. The copolymer had a weight average molecular weight of 1,300.

Example 3

Production of Copolymer of N,N-Dimethylallylamine and Carbamoylated Allylamine (7/3)

702.26 Grams (yield 93%) of an aqueous solution having a concentration of 10.11 wt % of a free type copolymer of N,N-dimethylallylamine and carbamoylated allylamine was obtained in the same manner as in Example 1 except that 459.32 g of the aqueous solution having a concentration of 14.20 wt % of a free type copolymer (copolymerization ratio 7:3) of N,N-dimethylallylamine and allylamine, prepared in Preparation Example 3, as a replacement for the aqueous solution of a free type copolymer of N,N-dimethylallylamine and allylamine, prepared in Example 1, 221.02 g of the sodium cyanate aqueous solution and 61.98 g of the sodium hydroxide aqueous solution were used. The copolymer had a weight average molecular weight of 1,100.

Example 4

Production of Copolymer of N,N-Dimethylallylamine and Methoxycarbamoylated Allylamine (5/5)

A one-liter four-necked separable flask having a stirrer, a Dimroth condenser and a thermometer was charged with 421.29 g of the aqueous solution having a concentration of 14.35 wt % of a free type copolymer of N,N-dimethylallylamine and allylamine, prepared in Example 1, the aqueous solution was warmed to 50° C., 38.67 g of dimethyl carbonate having a purity of 99% was dropwise added, and the mixture was allowed to react for 24 hours.

After completion of the reaction, methanol formed as a byproduct was distilled off at 50° C. under reduced pressure (80 mmHg) to give 383.85 g (yield 99%) of an aqueous solution having a concentration of 21.98 wt % of a free type copolymer (copolymerization ratio 5:5) of N,N-dimethylallylamine and methoxycarbonylated allylamine. The copolymer had a weight average molecular weight of 1,300.

Part of the copolymer aqueous solution was converted to a hydrochloride, and the hydrochloride was reprecipitated from an acetone solvent to give a copolymer hydrochloride. The elemental analysis thereof showed a result of C=50.31, H=8.93 and N=11.37. These values were equivalent to calculated values of C=50.73, H=8.94 and N=11.83. The methoxycarbonylation molar fraction of the copolymer hydrochloride was calculated on the basis of acid-base titration. As a result, it was 49.46%, which was nearly in agreement with the elemental analysis result.

Example 5

Production of Copolymer of
N,N-Dimethylallylamine and
Methoxycarbamoylated Allylamine (3/7)

406.02 Grams (yield 100%) of an aqueous solution having a concentration of 22.12 wt % of a free type copolymer (copolymerization ratio 3:7) of N,N-dimethylallylamine and methoxycarbonylated allylamine was obtained in the same manner as in Example 4 except that 390.23 g of the aqueous solution having a concentration of 14.27 wt % of a free type copolymer of N,N-dimethylallylamine and allylamine, prepared in Example 2, as a replacement for the aqueous solution of a free type copolymer of N,N-dimethylallylamine and allylamine, prepared in Example 1 and 54.14 g of dimethyl carbonate were used. The copolymer had a weight average molecular weight of 1,300.

Example 6

Production of Copolymer of
N,N-Dimethylallylamine and
Methoxycarbamoylated Allylamine (7/3)

359.63 Grams (yield 99%) of an aqueous solution having a concentration of 22.08 wt % of a free type copolymer (copolymerization ratio 3:7) of N,N-dimethylallylamine and methoxycarbamoylated allylamine was obtained in the same manner as in Example 4 except that 459.32 g of the aqueous solution having a concentration of 14.20 wt % of a free type copolymer of N,N-dimethylallylamine and allylamine, prepared in Example 3, as a replacement for the aqueous solution of a free type copolymer of N,N-dimethylallylamine and allylamine, prepared in Example 1 and 23.20 g of dimethyl carbonate were used. The copolymer had a weight average molecular weight of 1,200.

Example 7

Production of Copolymer of
N,N-Dimethylallylamine and Acetylated Allylamine
(5/5)

A 500-ml four-necked separable flask having a stirrer, a Dimroth condenser and a thermometer was charged with 421.29 g of the aqueous solution having a concentration of 14.35 wt % of a free type copolymer of N,N-dimethylallylamine and allylamine, prepared in Example 1. With cooling with ice, a portion from 44.27 g of acetic anhydride having a purity of 98% was dropwise added in such an amount that corresponded to ½ molar amount of allylamine, to neutralize that portion of 34.00 g of sodium hydroxide having a concentration of 50% which corresponded to a molar amount of acetic acid formed as a byproduct, and the entire amount of the acetic anhydride was dropwise added by repeating this procedure, followed by a reaction for 24 hours.

The thus-obtained solution was subjected to electrodialysis for desalting, to give 522.50 g (100%) of an aqueous solution having a concentration of 14.94 wt % of a free type copolymer (copolymerization ratio 5:5) of N,N-dimethylallylamine and acetylated allylamine. The copolymer had a weight average molecular weight of 1,200.

Part of the copolymer aqueous solution was converted to a hydrochloride, and the hydrochloride was reprecipitated from an acetone solvent to give a copolymer hydrochloride. The elemental analysis thereof showed a result of C=54.12, H=9.26 and N=12.47. These values were equivalent to calculated values of C=54.41, H=9.59 and N=12.69. The methoxycarbonylation molar fraction of the copolymer hydrochloride was calculated on the basis of acid-base titration. As a result, it was 50.12%, which was nearly in agreement with the elemental analysis result.

Example 8

Production of Copolymer of
N,N-Dimethylallylamine and Acetylated Allylamine
(3/7)

520.58 Grams (98%) of an aqueous solution having a concentration of 15.21 wt % of a free type copolymer (copolymerization ratio 3:7) of N,N-dimethylallylamine and acetylated allylamine was obtained in the same manner as in Example 7 except that 390.23 g of the aqueous solution having a concentration of 14.27 wt % of a free type copolymer of N,N-dimethylallylamine and allylamine, prepared in Preparation Example 2, as a replacement for the aqueous solution of a free type copolymer of N,N-dimethylallylamine and allylamine, prepared in Preparation Example 1, 61.98 g of acetic anhydride and 47.60 g of a sodium hydroxide aqueous solution were used. The copolymer had a weight average molecular weight of 1,300.

Example 9

Production of Copolymer of
N,N-Dimethylallylamine and Acetylated Allylamine
(7/3)

501.85 Grams (100%) of an aqueous solution having a concentration of 15.11 wt % of a free type copolymer (copolymerization ratio 7:3) of N,N-dimethylallylamine and acetylated allylamine was obtained in the same manner as in Example 7 except that 459.32 g of the aqueous solution having a concentration of 14.20 wt % of a free type copolymer of N,N-dimethylallylamine and allylamine, prepared in Preparation Example 3, as a replacement for the aqueous solution of a free type copolymer of N,N-dimethylallylamine and allylamine, prepared in Preparation Example 1, 26.56 g of acetic anhydride and 20.40 g of a sodium hydroxide aqueous solution were used. The copolymer had a weight average molecular weight of 1,100.

Example 10

Production of Copolymer of
N,N-Dimethylallylamine and
Monocarbamoylethylated Allylamine (5/5)

A 500-ml four-necked separable flask having a stirrer, a Dimroth condenser and a thermometer was charged with 421.29 g of the aqueous solution having a concentration of 14.35 wt % of a free type copolymer of N,N-dimethylallylamine and allylamine, prepared in Example 1, the aqueous solution was warmed to 50° C., 60.42 g of acrylamide having a concentration of 50% was dropwise added, and the mixture was allowed to react for 24 hours.

There was obtained 465.52 g (97%) of an aqueous solution having a concentration of 18.82 wt % of a free type copolymer of N,N-dimethylallylamine and monocarbamoylethylated allylamine (copolymerization ratio 5:5). The copolymer had a weight average molecular weight of 1,200.

Part of the copolymer aqueous solution was converted to a hydrochloride, and the hydrochloride was reprecipitated from an acetone solvent to give a copolymer hydrochloride. The elemental analysis thereof showed a result of C=45.84, H=8.69 and N=14.38. These values were equivalent to calculated values of C=46.16, H=8.80 and N=14.68. The monopropylamidation molar fraction of the copolymer hydrochloride was calculated on the basis of acid-base titration. As a result, it was 48.15%, which was nearly in agreement with the elemental analysis result.

Example 11

Production of Copolymer of
N,N-Dimethylallylamine and
Monocarbamoylethylated Allylamine (3/7)

461.14 Grams (97%) of an aqueous solution having a concentration of 20.64 wt % of a free type copolymer (copolymerization ratio 3:7) of N,N-dimethylallylamine and monocarbamoylethylated allylamine was obtained in the same manner as in Example 10 except that 390.23 g of the aqueous solution having a concentration of 14.27 wt % of a free type copolymer of N,N-dimethylallylamine and allylamine, prepared in Preparation Example 2, as a replacement for the aqueous solution of a free type copolymer of N,N-dimethylallylamine and allylamine, prepared in Preparation Example 1 and 84.58 g of acrylamide were used. The copolymer had a weight average molecular weight of 1,300.

Example 12

Production of Copolymer of
N,N-Dimethylallylamine and
Monocarbamoylethylated Allylamine (7/3)

475.15 Grams (96%) of an aqueous solution having a concentration of 16.82 wt % of a free type copolymer (copolymerization ratio 7:3) of N,N-dimethylallylamine and monocarbamoylethylated allylamine was obtained in the same manner as in Example 10 except that 459.32 g of the aqueous solution having a concentration of 14.20 wt % of a free type copolymer of N,N-dimethylallylamine and allylamine, prepared in Preparation Example 3, as a replacement for the aqueous solution of a free type copolymer of N,N-dimethylallylamine and allylamine, prepared in Preparation Example 1 and 36.25 g of acrylamide were used. The copolymer had a weight average molecular weight of 1,200.

Example 13

Production of Copolymer of
N,N-Dimethylallylamine and Dicarbamoylethylated
Allylamine (5/5)

521.09 Grams (96%) of an aqueous solution having a concentration of 22.30 wt % of a free type copolymer (copolymerization ratio 5:5) of N,N-dimethylallylamine and dicarbamoylethylated allylamine was obtained in the same manner as in Example 10 except that 120.83 g of acrylamide was used in Example 10. The copolymer had a weight average molecular weight of 1,200.

Part of the copolymer aqueous solution was converted to a hydrochloride, and the hydrochloride was reprecipitated from an acetone solvent to give a copolymer hydrochloride. The elemental analysis thereof showed a result of C=46.68, H=8.23 and N=15.41. These values were equivalent to calculated values of C=47.00, H=8.48 and N=15.62. The dipropylamidation molar fraction of the copolymer hydrochloride was calculated on the basis of acid-base titration. As a result, it was 48.06%, which was nearly in agreement with the elemental analysis result.

Example 14

Production of Copolymer of
N,N-Dimethylallylamine and Dicarbamoylethylated
Allylamine (3/7)

541.72 Grams (97%) of an aqueous solution having a concentration of 25.08 wt % of a free type copolymer (copolymerization ratio 3:7) of N,N-dimethylallylamine and dicarbamoylethylated allylamine was obtained in the same manner as in Example 10 except that 169.17 g of acrylamide was used in Example 11. The copolymer had a weight average molecular weight of 1,300.

Example 15

Production of Copolymer of
N,N-Dimethylallylamine and Dicarbamoylethylated
Allylamine (7/3)

508.15 Grams (96%) of an aqueous solution having a concentration of 19.08 wt % of a free type copolymer (copolymerization ratio 7:3) of N,N-dimethylallylamine and dicarbamoylethylated allylamine was obtained in the same manner as in Example 10 except that 72.50 g of acrylamide was used in Example 12. The copolymer had a weight average molecular weight of 1,100.

Example 16

Production of Copolymer of
N,N-Dimethylallylamine and
Monoethoxy-2-Hydroxypropylated Allylamine (5/5)

A 500-ml four-necked separable flask having a stirrer, a Dimroth condenser and a thermometer was charged with 421.29 g of the aqueous solution having a concentration of 14.35 wt % of a free type copolymer of N,N-dimethylallylamine and allylamine, prepared in Preparation Example 1, the aqueous solution was warmed to 50° C., 43.41 g of ethyl glycidyl ether having a purity of 100% was dropwise added, and the mixture was allowed to react for 24 hours.

There was obtained 463.95 g (100%) of an aqueous solution having a concentration of 22.35 wt % of a free type copolymer of N,N-dimethylallylamine and monoethoxy-2-hydroxypropylated allylamine (copolymerization ratio 5:5). The copolymer had a weight average molecular weight of 1,200.

Part of the copolymer aqueous solution was converted to a hydrochloride, and the hydrochloride was reprecipitated from an acetone solvent to give a copolymer hydrochloride. The elemental analysis thereof showed a result of C=49.44, H=9.41 and N=8.59. These values were equivalent to calculated values of C=49.21, H=9.53 and N=8.83. The monoethoxy-2-hydroxypropylation molar fraction of the copolymer hydrochloride was calculated on the basis of acid-base titration. As a result, it was 50.23%, which was nearly in agreement with the elemental analysis result.

Example 17

Production of Copolymer of
N,N-Dimethylallylamine and
Monoethoxy-2-Hydroxypropylated Allylamine (3/7)

450.37 Grams (100%) of an aqueous solution having a concentration of 25.82 wt % of a free type copolymer (copolymerization ratio 3:7) of N,N-dimethylallylamine and monoethoxy-2-hydroxypropylated allylamine was obtained in the same manner as in Example 16 except that 390.23 g of the aqueous solution having a concentration of 14.27 wt % of a free type copolymer of N,N-dimethylallylamine and allylamine, prepared in Preparation Example 2, as a replacement for the aqueous solution of a free type copolymer of N,N-dimethylallylamine and allylamine, prepared in Preparation Example 1 and 60.77 g of ethyl glycidyl ether were used. The copolymer had a weight average molecular weight of 1,300.

Example 18

Production of Copolymer of
N,N-Dimethylallylamine and
monoethoxy-2-hydroxypropylated Allylamine (7/3)

484.05 Grams (100%) of an aqueous solution having a concentration of 18.80 wt % of a free type copolymer (copolymerization ratio 7:3) of N,N-dimethylallylamine and monoethoxy-2-hydroxypropylated allylamine was obtained in the same manner as in Example 16 except that 459.32 g of the aqueous solution having a concentration of 14.20 wt % of a free type copolymer of N,N-dimethylallylamine and allylamine, prepared in Preparation Example 3, as a replacement for the aqueous solution of a free type copolymer of N,N-dimethylallylamine and allylamine, prepared in Preparation Example 1 and 26.04 g of ethyl glycidyl ether were used. The copolymer had a weight average molecular weight of 1,100.

Example 19

Production of Copolymer of
N,N-Dimethylallylamine and
diethoxy-2-hydroxypropylated Allylamine (5/5)

504.19 Grams (99%) of an aqueous solution having a concentration of 28.98 wt % of a free type copolymer (copolymerization ratio 5:5) of N,N-dimethylallylamine and diethoxy-2-hydroxypropylated allylamine was obtained in the same manner as in Example 16 except that 86.81 g of ethyl glycidyl ether was used in Example 16. The copolymer had a weight average molecular weight of 1,200.

Part of the copolymer aqueous solution was converted to a hydrochloride, and the hydrochloride was reprecipitated from an acetone solvent to give a copolymer hydrochloride. The elemental analysis thereof showed a result of C=61.78, H=11.11 and N=7.89. These values were equivalent to calculated values of C=61.57, H=11.20 and N=8.01. The diethoxy-2-hydroxypropylation molar fraction of the copolymer hydrochloride was calculated on the basis of acid-base titration. As a result, it was 49.62%, which was nearly in agreement with the elemental analysis result.

Example 20

Production of Copolymer of
N,N-Dimethylallylamine and
diethoxy-2-hydroxypropylated Allylamine (3/7)

507.26 Grams (99%) of an aqueous solution having a concentration of 34.63 wt % of a free type copolymer (copolymerization ratio 3:7) of N,N-dimethylallylamine and diethoxy-2-hydroxypropylated allylamine was obtained in the same manner as in Example 17 except that 121.54 g of ethyl glycidyl ether was used in Example 17. The copolymer had a weight average molecular weight of 1,400.

Example 21

Production of Copolymer of
N,N-Dimethylallylamine and
diethoxy-2-hydroxypropylated Allylamine (7/3)

507.52 Grams (99%) of an aqueous solution having a concentration of 22.94 wt % of a free type copolymer (copolymerization ratio 7:3) of N,N-dimethylallylamine and diethoxy-2-hydroxypropylated allylamine was obtained in the same manner as in Example 18 except that 52.09 g of ethyl glycidyl ether was used in Example 18. The copolymer had a weight average molecular weight of 1,200.

Example 22

Production of Terpolymer of
N,N-Dimethylallylamine, Carbamoylated Allylamine
and Allylamine (5/3/2)

606.48 Grams (99%) of an aqueous solution having a concentration of 11.65 wt % of a free type terpolymer of N,N-dimethylallylamine, carbamoylated allylamine and allylamine was obtained in the same manner as in Example 1 except that 221.02 g of a sodium cyanate aqueous solution and 54.40 g of a sodium hydroxide aqueous solution were used in Example 1. The copolymer had a weight average molecular weight of 1,200.

Example 23

Production of Terpolymer of
N,N-Dimethylallylamine, Methoxycarbonylated
Allylamine and Allylamine (5/3/2)

390.46 Grams (yield 100%) of an aqueous solution having a concentration of 19.25 wt % of a free type terpolymer of N,N-dimethylallylamine, methoxycarbonylated allylamine and allylamine was obtained in the same manner as in Example 4 except that 23.20 g of dimethyl carbonate was used in Example 4. The copolymer had a weight average molecular weight of 1,200.

Example 24

Production of Terpolymer of
N,N-Dimethylallylamine, Acetylated Allylamine and
Allylamine (5/3/2)

523.48 Grams (100%) of an aqueous solution having a concentration of 13.58 wt % of a free type terpolymer of N,N-dimethylallylamine, acetylated allylamine and allylamine was obtained in the same manner as in Example 7 except that 26.56 g of acetic anhydride and 20.40 g of a sodium hydroxide aqueous solution were used in Example 7. The copolymer had a weight average molecular weight of 1,200.

Example 25

Production of Terpolymer of N,N-Dimethylallylamine, Monocarbamoylethylated Allylamine and Allylamine (5/3/2)

455.93 Grams (100%) of an aqueous solution having a concentration of 17.17 wt % of a free type terpolymer of N,N-dimethylallylamine, monocarbamoylethylated allylamine and allylamine was obtained in the same manner as in Example 10 except that 36.25 g of acrylamide was used in Example 10. The copolymer had a weight average molecular weight of 1,200.

Example 26

Production of Terpolymer of N,N-Dimethylallylamine, Monoethoxy-2-Hydroxypropylated Allylamine and Allylamine (5/3/2)

447.07 Grams (100%) of an aqueous solution having a concentration of 19.34 wt % of a free type terpolymer of N,N-dimethylallylamine, monoethoxy-2-hydroxypropylated allylamine and allylamine was obtained in the same manner as in Example 16 except that 26.04 g of ethyl glycidyl ether was used in Example 16. The copolymer had a weight average molecular weight of 1,200.

Test Example 1

The modified polyallylamines of the present invention (Examples 1 to 26) were tested for performances with regard to color developability and the property of being free from the occurrence of a residual waste liquid in inkjet recording. Table 2 shows the results. For comparison, further, an allylamine homopolymer, the copolymers of allylamine and dimethylallylamine (Preparation Examples 1 to 3) and a dimethylallylamine homopolymer were also similarly tested. Table 3 shows the results. As a result, it has been found that the modified polyallylamine of the present invention exhibits remarkably excellent performances with regard to color developability and the property of being free from the occurrence of a residual waste liquid. The method for the evaluation and the results thereof will be explained in detail below.

Preparation of Liquid Composition

Liquid compositions having the following composition were prepared.

Liquid Composition

| | |
|---|---|
| Modified polyallylamine of the present invention | 5.0% by weight (as a solid) |
| Glycerin (Gly) | 25.0% by weight |
| Triethylene glycol monobutyl ether | 3.0% by weight |
| Olefin E1010 | 0.3% by weight |
| Water | Balance |

Ink Set

An ink composition was prepared by the following procedures. First, a pigment and a dispersion liquid (containing styrene-acrylate copolymer) were mixed, and they were dispersed in a sand mill (Yasukawa Seisakusho) together with glass beads (diameter 1.7 mm, an amount (weight) 1.5 times the amount of the mixture) for 2 hours. Then, the glass beads were removed, other additives were added, and the mixture was stirred at room temperature for 20 minutes. The mixture was filtered with a 10 μm membrane filter to give a pigment ink.

Ink Composition

| | |
|---|---|
| Pigment | 3.0 parts by weight |
| Styrene-acrylate copolymer | 1.0 part by weight |
| Olefin E1010 | 0.5 part by weight |
| Gly | 15.0 parts by weight |
| TEGmBE | 5.0 parts by weight |
| TEA | 0.9 part by weight |
| Water | Balance |
| Total | 100 parts by weight |

As pigments, C.I. Pigment Yellow 74 was used for yellow, C.I. Pigment Red 202 was used for magenta, C.I. Pigment Blue 15:3 was used for cyan, and carbon black was used for black.

Abbreviations in the ink composition are as described above.

Gly: Glycerin

TEGmBE: Triethylene glycol monobutyl ether

TEA: Triethanolamine

Olefin E1010: Acetylene-glycol-based surfactant (Nisshin Chemical Industry Co., Ltd.)

Printing Evaluation

"duty" refers to a value calculated on the basis of the following equation.

$$\text{duty (\%)} = \text{number of actual printing dots}/(\text{longitudinal resolution} \times \text{transverse resolution}) \times 100$$

In the equation, the "number of actual printing dots" is the number of printing dots per unit area, and the "longitudinal resolution" and "transverse" resolution refer to resolutions per unit area. "100% duty" refers to a monochromic maximum ink weight per pixel.

Evaluation 1 Color Development Test (Ordinary Paper)

A liquid composition and an ink set were charged into an inkjet printer ("MC-2000" supplied by Seiko Epson Corporation), printing was conducted on an ordinary paper (Xerox 4024) at 720×720 dpi. In this case, the printing was conducted using the ink composition at 70% duty and, almost at the same time, using the liquid composition at 10% duty.

The thus-obtained print was measured for an optical density. The optical density was measured with "Gretag-Macbeth SPM50" supplied by Gretag Macbeth AG using a D50 light source without a filter at a viewing angle of 2°.

(Evaluation Standard)

AA: A non-colored portion is not easily visually observable, and the OD value increases and is greater than a case where no liquid composition is printed, by 0.06 or more.

A: A non-colored portion is not easily visually observable, and the OD value increases and is greater than a case where no liquid composition is printed, by at least 0.03 and less than 0.06.

B: A non-colored portion is easily visually observable, and the OD value increases and is greater than a case where no liquid composition is printed, by less than 0.03.

Table 3 shows the evaluation results. In Examples, those portions which were not colored were not easily visually observable, and the OD values increased to be greater by at least 0.03.

Evaluation Standard

S: In each of the procedures that are carried out 100 times, the check pattern is normally printed, and no residual waste liquid occurs in the cap.

AA: In each of the procedures that are carried out 50 times, the check pattern is normally printed, and no residual waste liquid occurs in the cap.

A: In each of the procedures that are carried out 10 times, the check pattern is normally printed, and no residual waste liquid occurs in the cap.

B: In each of the procedures that are carried out 10 times, the check pattern is normally printed, while a slight residual waste liquid occurs in the cap.

C: The check pattern is sometimes not normally printed, and a residual waste liquid occurs in the cap.

TABLE 2

| Polymer used | Modified polyallylamine of the invention | | | | | Performance test | |
|---|---|---|---|---|---|---|---|
| | Substituent of N-substituted allylamine | DMA | SAA | DSA | MAA | Color Dev. | C. of d. of w.l. |
| Ex. 1 | —CONH$_2$ | 5 | 5 | 0 | 0 | AA | S |
| Ex. 2 | —CONH$_2$ | 3 | 7 | 0 | 0 | AA | S |
| Ex. 3 | —CONH$_2$ | 7 | 3 | 0 | 0 | AA | S |
| Ex. 4 | —COOMe | 5 | 5 | 0 | 0 | AA | S |
| Ex. 5 | —COOMe | 3 | 7 | 0 | 0 | AA | S |
| Ex. 6 | —COOMe | 7 | 3 | 0 | 0 | AA | S |
| Ex. 7 | —COMe | 5 | 5 | 0 | 0 | AA | S |
| Ex. 8 | —COMe | 3 | 7 | 0 | 0 | AA | S |
| Ex. 9 | —COMe | 7 | 3 | 0 | 0 | AA | S |
| Ex. 10 | —CH$_2$CH$_2$CONH$_2$ | 5 | 5 | 0 | 0 | AA | S |
| Ex. 11 | —CH$_2$CH$_2$CONH$_2$ | 3 | 7 | 0 | 0 | AA | AA |
| Ex. 12 | —CH$_2$CH$_2$CONH$_2$ | 7 | 3 | 0 | 0 | AA | S |
| Ex. 13 | —CH$_2$CH$_2$CONH$_2$ | 5 | 0 | 5 | 0 | AA | S |
| Ex. 14 | —CH$_2$CH$_2$CONH$_2$ | 3 | 0 | 7 | 0 | AA | S |
| Ex. 15 | —CH$_2$CH$_2$CONH$_2$ | 7 | 0 | 3 | 0 | AA | S |
| Ex. 16 | —CH$_2$CH(OH)CH$_2$OEt | 5 | 5 | 0 | 0 | AA | S |
| Ex. 17 | —CH$_2$CH(OH)CH$_2$OEt | 3 | 7 | 0 | 0 | AA | AA |
| Ex. 18 | —CH$_2$CH(OH)CH$_2$OEt | 7 | 3 | 0 | 0 | AA | S |
| Ex. 19 | —CH$_2$CH(OH)CH$_2$OEt | 5 | 0 | 5 | 0 | AA | S |
| Ex. 20 | —CH$_2$CH(OH)CH$_2$OEt | 3 | 0 | 7 | 0 | AA | S |
| Ex. 21 | —CH$_2$CH(OH)CH$_2$OEt | 7 | 0 | 3 | 0 | AA | S |
| Ex. 22 | —CONH$_2$ | 5 | 3 | 0 | 2 | AA | S |
| Ex. 23 | —COOMe | 5 | 3 | 0 | 2 | AA | S |
| Ex. 24 | —COMe | 5 | 3 | 0 | 2 | AA | S |
| Ex. 25 | —CH$_2$CH$_2$CONH$_2$ | 5 | 3 | 0 | 2 | AA | AA |
| Ex. 26 | —CH$_2$CH(OH)CH$_2$OEt | 5 | 3 | 0 | 2 | AA | AA |

(Notes)
Ex. = Example
Color Dev. = Color developability
C. of d. of w.l. = Capability of disposal of waste liquid
DMA: N,N-dimethylallylamine
SAA: N-monosubstituted allylamine
DSA: N,N-disubstituted allylamine
MAA: monoallylamine Evaluation 2 Waste-Liquid-Disposal Performance of a Cap With Woven Fabric A liquid composition and an ink set were charged into an inkjet printer ("MC-2000" supplied by Seiko Epson Corporation), and the cleaning of a recording head (to push a cleaning button of the printer once) and the printing of a nozzle check pattern were repeated. These procedures were repeated 10 times to judge whether or not nozzle check patterns were normally printed. Further, a state of a waste liquid in the cap (with a non-woven fabric) was observed. Further, with regard to those liquid composition that resulted in A, the above procedures were carried out 90 times to judge whether or not the check pattern was normally printed.

TABLE 3

| | Polymer of Comparative Example | | Performance test | |
|---|---|---|---|---|
| | | MAA molar ratio | DMA molar ratio | Color Dev. | C. of d. of w.l. |
| | Polymer used | | | | |
| CEx. 1 | Polyallylamine (Mw 1000) | 10 | 0 | AA | B |
| CEx. 2 | Copolymer of Preparation Example 3 | 7 | 3 | AA | A |
| CEx. 3 | Copolymer of Preparation Example 1 | 5 | 5 | AA | A |

TABLE 3-continued

| Polymer of Comparative Example | | | Performance test | |
|---|---|---|---|---|
| Polymer used | MAA molar ratio | DMA molar ratio | Color Dev. | C. of d. of w.l. |
| CEx. 4 Copolymer of Preparation Example 2 | 3 | 7 | AA | A |
| CEx. 5 Poly(dimethylallylamine) Mw 900) | 0 | 10 | AA | A |

(Notes)
CEx. = Comparative Example
Color Dev. = Color developability
C. of d. of w.l. = Capability of disposal of waste liquid
MAA: monoallylamine
DMA: N,N-dimethylallylamine

INDUSTRIAL UTILITY

The modified polyallylamine of the present invention exhibits excellent color developability and is easily soluble in water and organic solvents, and it also exhibits excellent stability in a solution containing water or organic solvent(s), so that it can be suitably used in fine chemical fields such as the field of inkjet recording.

The invention claimed is:

1. A modified polyallylamine comprising, as an essential component, a unit of the general formula (M-1),

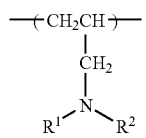
(M-1)

wherein each of $R^1$ and $R^2$ is independently an alkyl group having 1 to 4 carbon atoms, comprising at least one unit selected from units of the formula (M-2),

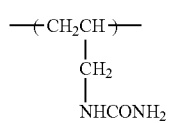
(M-2)

the general formula (M-3),

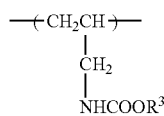
(M-3)

wherein $R^3$ is an alkyl group having 1 to 12 carbon atoms or an aryl group having 6 to 12 carbon atoms, the general formula (M-4),

(M-4)

wherein $R^4$ is an alkyl group having 1 to 12 carbon atoms, the general formula (M-5),

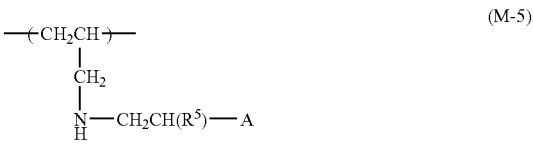
(M-5)

wherein $R^5$ is a hydrogen atom or methyl and A is $-CONR^6R^7$, $-CN$ or $-COOR^8$, in which each of $R^6$ and $R^7$ is independently a hydrogen atom or an alkyl group having 1 to 8 carbon atoms and optionally containing a hydroxyl group, a keto group, a mono($C_1$-$C_4$ alkyl) amino group, a di($C_1$-$C_4$ alkyl) amino group or a tri($C_1$-$C_4$ alkyl) ammonium group, and $R^6$ and $R^7$ may bond to each other and form a piperidino or morpholino group together with a nitrogen atom, and $R^8$ is an alkyl group having 1 to 8 carbon atoms and optionally containing a hydroxyl group, a keto group, a mono($C_1$-$C_4$ alkyl) amino group, a di($C_1$-$C_4$ alkyl) amino group or a tri($C_1$-$C_4$ alkyl) ammonium group, the general formula (M-6),

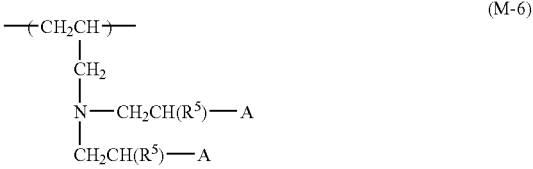
(M-6)

wherein $R^5$ and A are as defined above, the general formula (M-7),

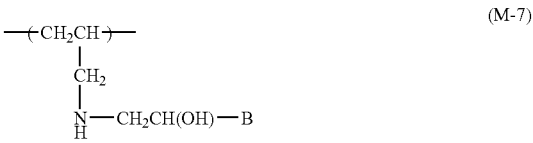
(M-7)

wherein B is an alkyl group having 1 to 8 carbon atoms and optionally containing a hydroxyl group, an alkoxyl or alkenyloxy group having 1 to 4 carbon atoms, and the general formula (M-8),

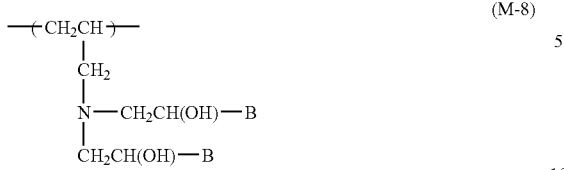

wherein B is as defined as said B,
and optionally containing a unit of the formula (M-9),

2. A modified polyallylamine having a structure of the general formula (I),

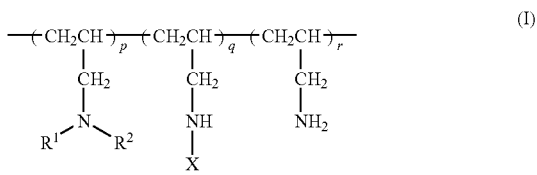

wherein each of $R^1$ and $R^2$ is independently an alkyl group having 1 to 4 carbon atoms, X is —$CONH_2$, —$COOR^3$, in which $R^3$ is an alkyl group having 1 to 12 carbon atoms or an aryl group having 6 to 12 carbon atoms, or —$COR^4$, in which $R^4$ is an alkyl group having 1 to 12 carbon atoms, each of p and q is independently an integer of 1 or more, and r is 0 or an integer of 1 or more.

3. A modified polyallylamine having a structure of the general formula (II),

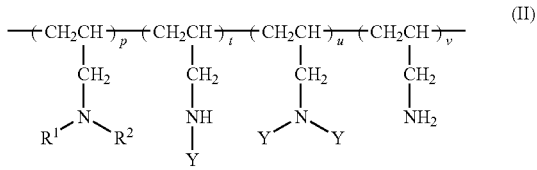

wherein each of $R^1$ and $R^2$ is independently an alkyl group having 1 to 4 carbon atoms, Y is —$CH_2CH(R^5)$—A, in which $R^5$ is a hydrogen atom or methyl and A is —$CONR^6R^7$, —CN or —$COOR^8$, in which each of $R^6$ and $R^7$ is independently a hydrogen atom or an alkyl group having 1 to 8 carbon atoms and optionally containing a hydroxyl group, a keto group, a mono($C_1$-$C_4$ alkyl) amino group, a di($C_1$-$C_4$ alkyl) amino group or a tri($C_1$-$C_4$ alkyl) ammonium group, $R^6$ and $R^7$ may bond to each other to form a piperidino or morpholino group together with a nitrogen atom, and $R^8$ is an alkyl group having 1 to 8 carbon atoms and optionally containing a hydroxyl group, a keto group, a mono($C_1$-$C_4$ alkyl) amino group, a di($C_1$-$C_4$ alkyl) amino group or a tri($C_1$-$C_4$ alkyl group) ammonium group, or —$CH_2CH(OH)$—B, in which B is an alkyl group having 1 to 8 carbon atoms and optionally containing a hydroxyl group or an alkoxyl or alkenyloxy group having 1 to 4 carbon atoms, p is an integer of 1 or more, and each of t, u and v is independently 0 or an integer of 1 or more, provided that at least one of t and u is an integer of 1 or more.

4. A process for producing a modified polyallylamine of the general formula (I-1), which comprises reacting a cyanic acid with a copolymer of N,N-dialkylallylamine and an allylamine, represented by the general formula (III),

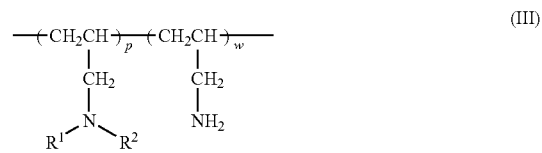

wherein each of $R^1$ and $R^2$ is independently an alkyl group having 1 to 4 carbon atoms and each of p and w is independently an integer of 1 or more,
to produce the modified polyallylamine of the general formula (I-1),

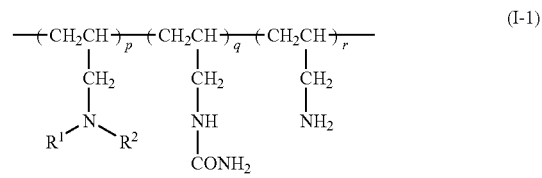

wherein q is an integer of 1 or more, r is 0 or an integer of 1 or more and $R^1$, $R^2$ and p are as defined above.

5. A process for producing a modified polyallylamine of the general formula (I-2), which comprises reacting an alkoxycarbonylation agent having 1 to 12 carbon atoms or an aryloxycarbonylation agent having 6 to 12 carbon atoms with a copolymer of N,N-dialkylallylamine and an allylamine, represented by the general formula (III),

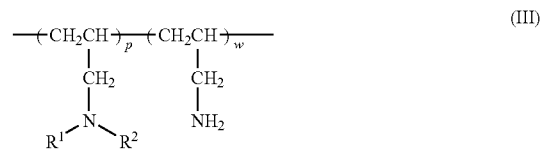

wherein each of $R^1$ and $R^2$ is independently an alkyl group having 1 to 4 carbon atoms and each of p and w is independently an integer of 1 or more,
to produce the modified polyallylamine of the general formula (I-2),

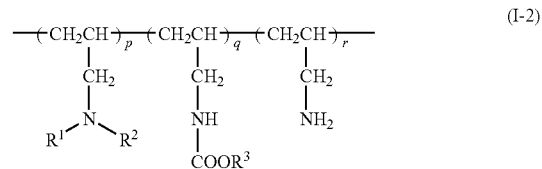

wherein $R^3$ is an alkyl group having 1 to 12 carbon atoms or an aryl group having 6 to 12 carbon atoms, q is an integer of 1 or more, r is 0 or an integer of 1 or more, and $R^1$, $R^2$ and p are as defined above.

6. The process for producing a modified polyallylamine as claimed in claim 5, wherein the alkoxycarbonylation agent or the aryloxycarbonylation agent is a carbonate diester represented by $R^3O-CO-OR^3$ in which $R^3$ is an alkyl group having 1 to 12 carbon atoms or an aryl group having 6 to 12 carbon atoms.

7. A process for producing a modified polyallylamine of the general formula (I-3), which comprises reacting an acylation agent having 1 to 12 carbon atoms with a copolymer of N,N-dialkylallylamine and an allylamine, represented by the general formula (III),

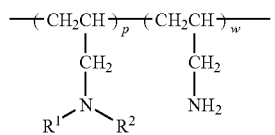
(III)

wherein each of $R^1$ and $R^2$ is independently an alkyl group having 1 to 4 carbon atoms and each of p and w is independently an integer of 1 or more, to produce the modified polyallylamine of the general formula (I-3),

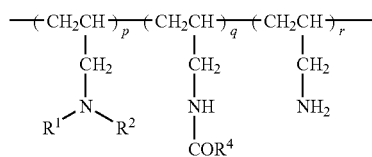
(I-3)

wherein $R^4$ is an alkyl group having 1 to 12 carbon atoms, q is an integer of 1 or more, r is 0 or an integer of 1 or more, and $R^1$, $R^2$ and p are as defined above.

8. The process for producing a modified polyallylamine as claimed in claim 7, wherein the acylation agent is an carboxylic anhydride of the general formula (IV), $(R^4CO)_2O$ (IV)

wherein $R^4$ is an alkyl group having 1 to 12 carbon atoms.

9. A process for producing a modified polyallylamine of the general formula (II-1), which comprises reacting an acryl compound of the general formula (V), $CH_2=C(R^6)-A$ (V)

wherein $R^5$ is a hydrogen atom or methyl and A is $-CONR^6R^7$, $-CN$ or $-COOR^8$, in which each of $R^6$ and $R^7$ is independently a hydrogen atom or an alkyl group having 1 to 8 carbon atoms and optionally containing a hydroxyl group, a keto group, a mono($C_1$-$C_4$ alkyl) amino group, a di($C_1$-$C_4$ alkyl) amino group or a tri($C_1$-$C_4$ alkyl) ammonium group and $R^6$ and $R^7$ may bond to each other and form a piperidino or morpholino group together with a nitrogen atom, and $R^8$ is an alkyl group having 1 to 8 carbon atoms and optionally containing a hydroxyl group, a keto group, a mono($C_1$-$C_4$ alkyl) amino group, a di($C_1$-$C_4$ alkyl) amino group or a tri($C_1$-$C_4$ alkyl) ammonium group, with a copolymer of N,N-dialkylallylamine and an allylamine, represented by the general formula (III),

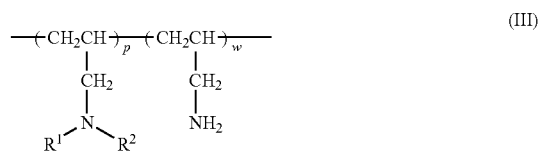
(III)

wherein each of $R^1$ and $R^2$ is independently an alkyl group having 1 to 4 carbon atoms and each of p and w is independently an integer of 1 or more, to produce the modified polyallylamine of the general formula (II-1),

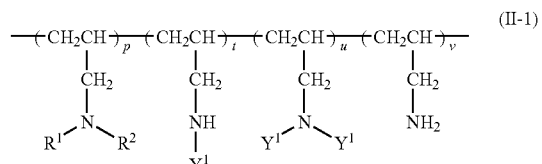
(II-1)

wherein $Y^1$ is a $-CH_2CH(R^5)-A$, each of t, u and v is independently 0 or an integer of 1 or more, provided that at least one of t and u is an integer of 1 or more, and $R^1$, $R^2$, $R^5$, A and p are as defined above.

10. A process for producing a modified polyallylamine of the general formula (II-2), which comprises reacting an epoxy compound of the general formula (VI),

(VI)

wherein B is an alkyl group having 1 to 8 carbon atoms and optionally containing a hydroxyl group, an alkoxyl or alkenyloxy group having 1 to 4 carbon atoms, with a copolymer of N,N-dialkylallylamine and an allylamine, represented by the general formula (III),

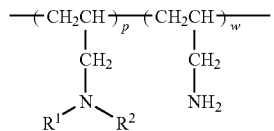 (III)

wherein each of $R^1$ and $R^2$ is independently an alkyl group having 1 to 4 carbon atoms and each of p and w is independently an integer of 1 or more, to produce the modified polyallylamine of the general formula (II-2),

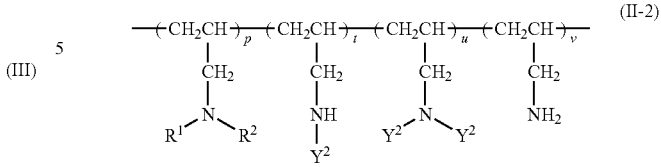 (II-2)

wherein $Y^2$ is a $CH_2CH(OH)$—B, each of t, u and v is independently an integer of 1 or more, provided that at least one of t and u is an integer of 1 or more, and $R^1$, $R^2$, B and p are as defined above.

* * * * *